United States Patent
Douglas, Sr.

[11] Patent Number: 5,664,272
[45] Date of Patent: Sep. 9, 1997

[54] AUTO CONTROL PILLOW FOR CARS, VANS, TRUCKS AND TRACTORS

[76] Inventor: Herman Douglas, Sr., Box 174, Norristown, Pa. 19404

[21] Appl. No.: 519,256

[22] Filed: Aug. 25, 1995

[51] Int. Cl.⁶ .............................. B62D 1/06; B60K 26/00
[52] U.S. Cl. .................... 5/652; 180/316; 74/558
[58] Field of Search ..................... 5/624, 648, 652, 5/636; 2/22, 23, 24, 911; 74/558, 515 R, 515 E; 180/316

[56] References Cited

U.S. PATENT DOCUMENTS

| | | |
|---|---|---|
| 1,172,552 | 2/1916 | Pierce ................................. 2/22 |
| 1,787,832 | 1/1931 | Mueller ............................... 5/636 |
| 2,522,120 | 9/1950 | Kaskey et al. ...................... 5/636 |
| 3,465,364 | 9/1969 | Edelson ................................. 2/22 |
| 4,177,806 | 12/1979 | Griffin ............................... 2/22 X |
| 4,728,939 | 3/1988 | Otani ............................ 74/515 R X |

*Primary Examiner*—Michael F. Trettel

[57] ABSTRACT

An Auto Control Pillow for cars, trucks, vans and tractors, has a hook and loop fastener material atop the pillow, with tube-like element placed beneath a soft foam filler and U shape plastic piece inserted within the plastic tubing for mounting onto a thigh to control the auto. The auto control has a conventional steering wheel cover for effective and safe use.

3 Claims, 1 Drawing Sheet

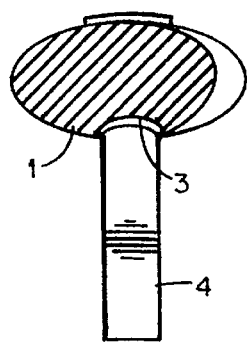 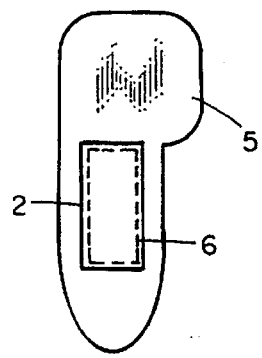 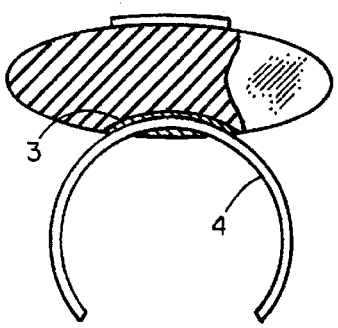
FIG. 1　　　　　FIG. 2　　　　　FIG. 3
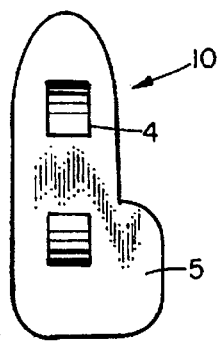 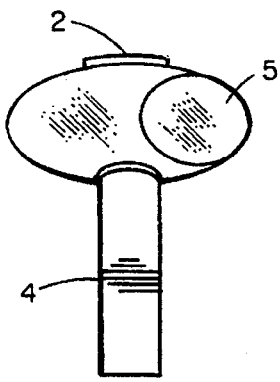 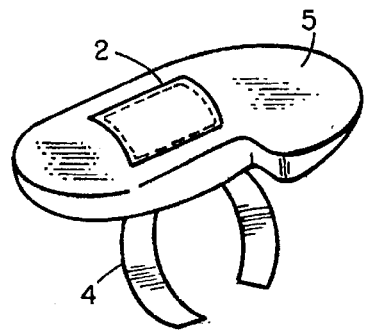
FIG. 4　　　　　FIG. 5　　　　　FIG. 6
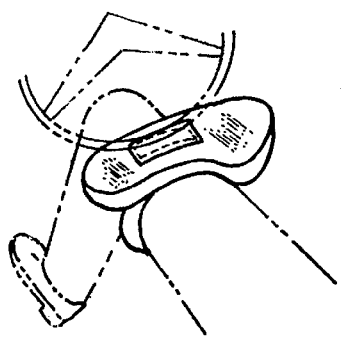
FIG. 7

AUTO CONTROL PILLOW FOR CARS, VANS, TRUCKS AND TRACTORS

SUMMARY OF INVENTION

It is therefore an important object of this invention to provide a safe and comfortable Auto Control Pillow (A.C.P.) This invention advantages are many, it helps the driver to reduce fatigue in long periods of operating a motor vehicles. The invention help the motor vehicle operator to relax the hands and at the same time, the hands can be in control of the vehicle quickly. There are less stress and can help the operator of the vehicle to be less tried when reaching the end of the trip. This invention can also be a driver releaver in a way of speaking. If something happen to the driver like and heartattack the vehicle would move in more or less a stright line, reducing the chance of going off of the road into some dangerous hole. This invention work almost like the speed control but with more control by the operator of the vehicle. The farmers will be able to use it on their farms if they have equipments with tilted steering wheels. The farmer will cut down on his fatigue by using this device.

This invention will inable the handicap and the stroke victims to drive a vehicle more safely by helping the person to drive longer. This manually operated device with it simple but effective design and inexpenseive construction will bring much pleasure and comfort to all that uses it.

Futher purposes and object of this invention will become more vividly clear as the specification proceeds.

This invention relates to cars, trucks, vans and tractors and particularly ones which are principally intended to be a driver aid when the hands are stressed and fatigued. This invention works most effective when used with tilted steering wheels and when the steering wheels are covered with either velvet or leather covering for a more effective auto control.

The auto control pillow of this type has never been used since man invented the auto for transportation. There is no device to rest the hands, but there is a device to rest the foot known as the speed control device made a part of the auto for years. This device makes it more pleasurable to take long drives on straight highways with out a lot of rest periods. This auto control pillow helps people to drive after sicknesses that limits their driving. Sickness like strokes, stiffnesses and the like.

This present invention provides a better way of travel on long distances for example, the road in TX I10 is long and straight. This device would be a dream come true for people that must do that driving. Holding the hands in a ball for many hours is not acceptable when the auto control pillow could make driving less stressful and painful. This invention creates no real risk to the driver because the driver always has control of the auto as the hands are resting while the thigh gives the hands a break or relief.

The present invention provides an improvement over the present way of driving on long straight highways alone and sometime fatigued from long distance travel. The present invention is easy to manufacture and the raw material is of plentiful supplies and can open up many jobs in the world. The auto control can fit into any persons budget because it can be made from less expensive materials. These and other benefits are obtained and the advantages clearly out weigh the disadvantages.

A preferred embodiment of the invention is illustrated in the drawings:

FIG. 1 is a cross section of the inside of the auto control pillow.

FIG. 2 is a top view of the invention

FIG. 3 is a view of the front showing retainer placement

FIG. 4 is a view of the bottom

FIG. 5 is a side view of the invention

FIG. 6 is a perspective of the finished auto control pillow combination of the above figures FIG. 7 is a view on the total combination use of the steering wheel cover and thigh pressing gently against the steering wheel, with the auto being under complete control of the thigh.

Referring first to the auto control pillow (ACP) form of FIGS. 1–7 it is made up of 6 pieces, foam 1, hook and loop fastener material 2, tubing 3, plastic retainer 4, fabric cover 5 and any suitable fastner materials 6, such as thread, sealing and fusing and the like. The cover 5 is used to protect the pillow from moisture and dirt. The outer part of the pillow will constitute a fabric, a strip of the hook and loop fastener material which will be treated with a water repellent. The outer facing fabric cover 5 will vary from pillow to pillow that will suit the customer needs. This will also determine the length and thickness of the auto control pillow. Each pillow 10 must be soft but firm and yet flexible enough to turn and control the auto. The fabric cover 5 should match the inside or the outside of the auto. The auto control pillow 10 laid out as FIG. 1 shows the layout should be flat with the fabric face down for neatness and will result in a more attractive appearance. The pillow shape is almost like a gun shape, but not limited to a gun like shape. It can also be square or any other shape that will be obvious in view of this invention. The assembly needs to be laid out with the fabric cover 5 face down and the foam 1 laid on top of the fabric cover 5, with the tubing 3 being inserted inside of the pillow with reinforced stitched openings at both ends. The U-shaped retainer 4 is placed within the tube to attach the pillow to the thigh comfortably.

The plastic tubing 3 is inserted inside of the pillow 10 for two important reasons, one to access and mount the plastic U shape retainer 4 and two to give more firm support to the foam. The flexible aspect must work to effectively control the steering wheel by using the pillow.

When the assembly of FIGS. 1–6 is made it may be considered advisable to fuse or heat seal the edges in putting the pillow 10 together. All of the different parts should be pre die cut for quick assembly. The simple construction of this unique and useful invention can be manufactured using the materials and tools already found in the industry.

It is not necessary to follow the order of assembly of the separate parts which is outlined above. Other sequences of putting the together and fusing the parts together will be obvious and may be followed.

A wide variety of suitable materials are available for use in this invention. The combination of fabric and plastic can be used and it may not be necessary to use both plastic and fabric, but the material must be either washable or wipeable. Although the material found in FIG. 1 is preferred any suitable material can be used. Such materials include plastic, silk, leather cotton, rayon, or denim. Similar functional materials may be used or substituted for these particular ones. Since the materials are all inexpensive and the assembly and fabrication is easily performed, the device can be sold at a low price and the buyer does not have to worry about the facts if it is soiled since it can be wiped or washed. This invention can also be used as a neck support pillow.

I claim:

1. A combined motor vehicle control pillow and tiltable steering wheel cover unit for straight highway driving comprising:

a fabric covered foam piece;

a hook and loop fastener strip mounted on one surface of said fabric covered foam piece; said hook and loop fastener strip being arranged to engage a steering wheel cover, said cover of said steering wheel being of a suitable material to be gripped by said hook and loop fastener strip; and a U-shaped plastic retainer secured to the opposite surface of said fabric covered foam piece, said U-shaped plastic retainer being adapted to fit on a thigh of a driver of a motor vehicle, whereby when said steering wheel is tilted toward the foam piece on the thigh of the driver a gripping contact is established between said hook and loop fastener strip and said steering wheel cover to maintain said steering wheel in a rotationless attitude.

2. The device of claim 1 wherein said fabric covered foam piece can be covered by plastic, silk, leather cotton, and rayon or denim.

3. The pillow of claim 1 wherein said U shaped retainer is mounted up beneath the said pillow and is supported by a tunnel opening for easy assembly and cleaning.

* * * * *